(12) United States Patent
Norquay (10) Patent No.: US 7,195,270 B2
(45) Date of Patent: Mar. 27, 2007

(54) SUPPORT DEVICE FOR HITCH MOUNTED ACCESSORIES

(76) Inventor: Ian Norquay, 604 Pigeon Bluff Rd., Winnipeg, Manitoba (CA) R1A 4J9

( * ) Notice: Subject to any disclaimer, the term of this patent is extended or adjusted under 35 U.S.C. 154(b) by 224 days.

(21) Appl. No.: 10/720,757

(22) Filed: Nov. 25, 2003

(65) Prior Publication Data

US 2004/0124607 A1 Jul. 1, 2004

Related U.S. Application Data

(60) Provisional application No. 60/428,687, filed on Nov. 25, 2002.

(51) Int. Cl.
*A47F 7/00* (2006.01)
*B60R 9/10* (2006.01)

(52) U.S. Cl. .............. 280/491.5; 211/18; 211/22; 211/81

(58) Field of Classification Search .......... 280/480.1, 280/491.1, 491.3, 491.5; 211/17, 18, 21, 211/22, 24, 71.1, 87.01, 96, 99, 104, 95, 97, 211/81

See application file for complete search history.

(56) References Cited

U.S. PATENT DOCUMENTS

| 2,872,213 | A | * | 2/1959 | Hosford | 280/416.1 |
| 5,492,228 | A | * | 2/1996 | Botkin | 211/85.7 |
| 5,518,159 | A | * | 5/1996 | DeGuevara | 224/488 |
| 5,649,656 | A | * | 7/1997 | Davy | 224/405 |
| 6,125,945 | A | * | 10/2000 | Skaggs et al. | 172/439 |
| 6,832,709 | B2 | * | 12/2004 | Henry | 224/403 |
| 2002/0017770 | A1 | | 2/2002 | Parrish | |
| 2003/0146256 | A1 | * | 8/2003 | Olsen | 224/311 |

FOREIGN PATENT DOCUMENTS

FR 2689468 * 10/1993

* cited by examiner

*Primary Examiner*—Anne Marie Boehler
(74) *Attorney, Agent, or Firm*—Ryan W. Dupuis; Adrian D. Battison; Michael R. Williams (57) ABSTRACT

A support device is provided to accept hitch mounted bicycle carriers and other hitch accessories with the device being capable of being supported on the ground or against either a vertical or a horizontal surface. The support device is part consists firstly of a support receiver that accepts a wide range of commercial carriers built for 2 inch or 1¼ inch diameter square tongues and for those that bolt directly to fixed hitches. The support receiver connects to a frame of the support device which supports the receiver on various surfaces.

15 Claims, 9 Drawing Sheets

SUPPORT DEVICE FOR HITCH MOUNTED ACCESSORIES

This application claims priority under 35 U.S.C. Section 119(e) to Provisional Patent Application Ser. No. 60/428,687 filed on Nov. 25, 2002.

FIELD OF THE INVENTION

The present invention relates to a support device for supporting a hitch accessory of the type which is typically receivable in a vehicle hitch receiver.

BACKGROUND

Bicycle carriers for attachment to a passenger vehicle hitch are common. Such bicycle carriers connect to the hitch by means of square tubing or by direct bolting. These devices, while doing an adequate job of transporting bicycles, become themselves another thing to store when not so employed.

The use of display stands supported on the floor are known for displaying various hitch accessories thereon in retail stores, however such display stands are typically designed for display only and not for actually supporting a load thereon. Typically multiple receivers are provided on such displays for displaying plural accessories on a single frame and accordingly the supporting frame is large and awkward for individual use. Furthermore known display stands have a square base supported at four corners which are suitable for being supported on the floor of a display area, however in actual practice for personal use, such four point support is not secure when seated on an uneven surfaces as is typical in older garages and various other store locations.

U.S. patent application publication no: 2002/0017770 to Parrish discloses a mounting plate supporting a receiver thereon. In one embodiment the receiver freely pivots relative to the mounting plate. When the mounting plate is supported against an upright supporting surface, no means are provided to support the receiver to extend horizontally in the desired orientation for supporting various hitch accessories thereon. Furthermore the mounting plate is not suitably orientated to be supported on a floor in a stable manner with a hitch accessory supported thereon.

SUMMARY

According to one aspect of the present invention there is provided a support device for supporting a hitch accessory of the type which is receivable in a vehicle hitch receiver; the support device comprising:

a support receiver comprising an elongate member having a cross section of suitable shape and dimension for mating with the hitch accessory in a telescoping configuration for relative sliding movement in a longitudinal direction of the support receiver; and a frame lying generally in a common plane and supporting the support receiver thereon in both a floor mounted position in which the longitudinal direction of the support receiver is generally parallel to the common plane of the frame and a wall mounted position in which the longitudinal direction of the support receiver is generally perpendicular to the common plane of the frame;

the frame providing support to maintain the support receiver in both the floor mounted and wall mounted positions relative to the frame.

The configuration of the frame to provide support to maintain the support receiver in either of the floor or wall mounted positions readily permits the same unit to be securely supported on the floor or an upright supporting surface such as a wall. The receiver can accordingly be supported in the desired horizontal orientation for supporting a hitch accessory thereon when the frame is supported on either a wall or floor.

According to a second aspect of the present invention there is provided a support device for supporting a hitch accessory of the type which is receivable in a vehicle hitch receiver; the support device comprising:

a support receiver comprising an elongate member having a cross section of suitable shape and dimension for mating with the hitch accessory in a telescoping configuration for relative sliding movement in a longitudinal direction of the support receiver; and a frame lying generally in a common plane and supporting the support receiver thereon;

the frame including 3 ground engaging points oriented in a triangular pattern for supporting the frame thereon.

According to a third aspect of the present invention there is provided a support device for supporting a hitch accessory of the type which is receivable in a vehicle hitch receiver; the support device comprising:

a support receiver comprising an elongate member having a cross section of suitable shape and dimension for mating with the hitch accessory in a telescoping configuration for relative sliding movement in a longitudinal direction of the support receiver; and a post mounted on an end of the support receiver oriented perpendicularly to the longitudinal direction of the support receiver;

the post including a plurality of through apertures oriented perpendicularly to the longitudinal direction of the support receiver.

The support receiver is preferably pivotally supported on the frame.

There may be provided a stop member receivable through co-operating apertures in both the support receiver and the frame in both the floor mounted and wall mounted positions for selectively maintaining the support receiver in the respective positions.

The support receiver is preferably a tubular member having an internal diameter between 1¼ inches and 1⅝ inches and having an external diameter between 1½ inches and 1⅞ inches.

The frame may include 3 ground engaging points oriented in a triangular pattern for supporting the frame thereon.

The frame preferably comprises a main support member and a cross support member supported at one end of the main support member in a T-shaped configuration. The support receiver is preferably supported on the main support member in this instance.

The frame includes mounting apertures formed therein for supporting the support receiver adjacent the cross support member in a first mounting configuration and for supporting the support receiver opposite the cross support member in a second mounting configuration.

Preferably, the main support member and the cross support member are selectively coupled together with threaded fasteners to permit ready disassembly and reassembly thereof.

There may be provided a pair of hangers for being supported on an upright supporting surface spaced apart from one another in which the hangers are suitably shaped for supporting the cross support member at spaced positions thereon.

In one embodiment, there may be provided two support receivers similarly configured to mate with the hitch accessory. The frame in this instance supports one of the receivers thereon in the wall mounted position and supports one of the receivers thereon in the floor mounted position.

The support receiver may additionally include a through aperture suitably sized for mounting a hitch ball thereon.

When the support receiver is pivotally secured to the frame with threaded fasteners received in cooperating apertures formed in the support receiver, the support receiver may alternatively be directly mounted onto a supporting surface by threaded fasteners through said apertures.

There may be provided clamping means for providing a clamping force between the hitch accessory and the support receiver in a direction transverse to relative sliding movement therebetween.

The frame preferably includes a locking aperture for receiving a locking member for securement to a fixed object.

BRIEF DESCRIPTION OF THE DRAWINGS

In the accompanying drawings, which illustrate exemplary embodiments of the present invention.

DETAILED DESCRIPTION

Referring to the accompanying drawings, there is illustrated a hitch accessory support device generally indicated by reference numeral 10. The support device 10 is particularly suited for supporting a hitch accessory 12 of the type having a tongue 13 typically receivable within a vehicle hitch receiver 14 of a vehicle 16.

The vehicle hitch receiver 14 normally receives a hitch tongue 17 having a hitch ball 18 supported thereon. The hitch accessory 12 in the illustrated embodiment is a bike carrier, however the support device is suitably arranged for mounting any one of various types of such accessories which mount on the hitch ball or are received within the vehicle hitch receiver 14 of a vehicle.

The device 10 includes a frame 20 and a support receiver 22 supported thereon. The support receiver 22 comprises an elongate tube which is hollow, having a square cross section with an open free end so as to be suitably arranged for slidably mating with the tongue 13 of the hitch accessory in a telescoping configuration in which the tongue and the support receiver are slidable relative to one another in a longitudinal direction of the support receiver. A transverse aperture 24 is provided which extends through both sides of the support receiver near the open free end 26 thereof. The transverse aperture 24 is oriented perpendicularly to the longitudinal direction for receiving a conventional latch pin therethrough for securing the tongue of the hitch accessory therein.

The support receiver includes an internal dimension which is between 1¼ inches and 1⅝ inches for slidably receiving a tongue having a 1¼ inch diameter cross section therein. The external dimension or diameter of the support receiver 22 is between 1½ inches and 1⅞ inches for slidably receiving a tongue 13 in the form of a 2 inch outer diameter tube over top the support receiver 22.

Adjacent the open free end 26, the support receiver 22 includes a hitch ball mounting hole 28 which comprises a through aperture extending through the support receiver perpendicularly to the transverse aperture 24 and the longitudinal direction of the receiver. The hitch ball mounting hole is of suitable dimension for receiving the threaded fastener of a hitch ball mount for mounting a hitch ball thereon as desired to accommodate various hitch accessories which mount in co-operation with the hitch ball.

The frame 20 includes a main support member 30 in the form of an elongate square tube and a cross support member 32 which is supported at one end of the main support member perpendicularly thereto in a T-shaped configuration. The main support member 30 includes a pair of mounting flanges 34 projecting laterally outwardly therefrom at opposing ends of the member to lie perpendicularly to the longitudinal direction of the members. Each of the mounting flanges 34 includes suitable bolt holes therein for co-operation with bolt holes 36 in the cross member so as to selectively mount the cross member thereon at either end of the main support member in respective first and second mounting configurations.

A pair of receiver flanges 38 are mounted on opposing sides of the main support member 30 adjacent one end thereof parallel to one another and the longitudinal direction of the main support member. The receiver flanges 38 are spaced apart from one another on opposing sides of the main support member while projecting upwardly from the member radially to the longitudinal direction thereof for receiving the support receiver 22 therebetween adjacent one end of the main support member. Accordingly when the cross support member 32 is mounted at either end of the main support member, its orientation and proximity relative to the support receiver 22 can be varied as per the first and second mounting configurations.

The cross support member 32 also comprises a square tube of rigid material in which the bolt holes 36 formed therein align with the bolt holes in the respective mounting flanges 34 of the main support member. The cross support member secures to the main support member by means of threaded fasteners to permit ready disassembly thereof and to permit variation of the mounting orientation at either end of the main support member. The cross support member 32 is provided with feet 40 at opposing ends which project from one side only transversely to a common plane within which the main support member 30 and cross support member 32 lie. The cross support member 32 can be rotated prior to assembly to the main support member such that the feet can be orientated to project on the same side as the support receiver 32 from the common plane of the frame or alternatively may project in an opposite direction. When supported on the floor, the feet 40 preferably are orientated to project away from the common plane opposite the support receiver 22 such that the frame is supported at three points including the two feet 40 and the opposing end of the main support 30 upon which the cross support member is not mounted.

A plurality of surface mounting holes 42 are provided in the frame which extend through the frame oriented perpendicularly to the common plane. The surface mounting holes 42 are provided at opposing ends of each of the main and cross support members.

Figure 2:
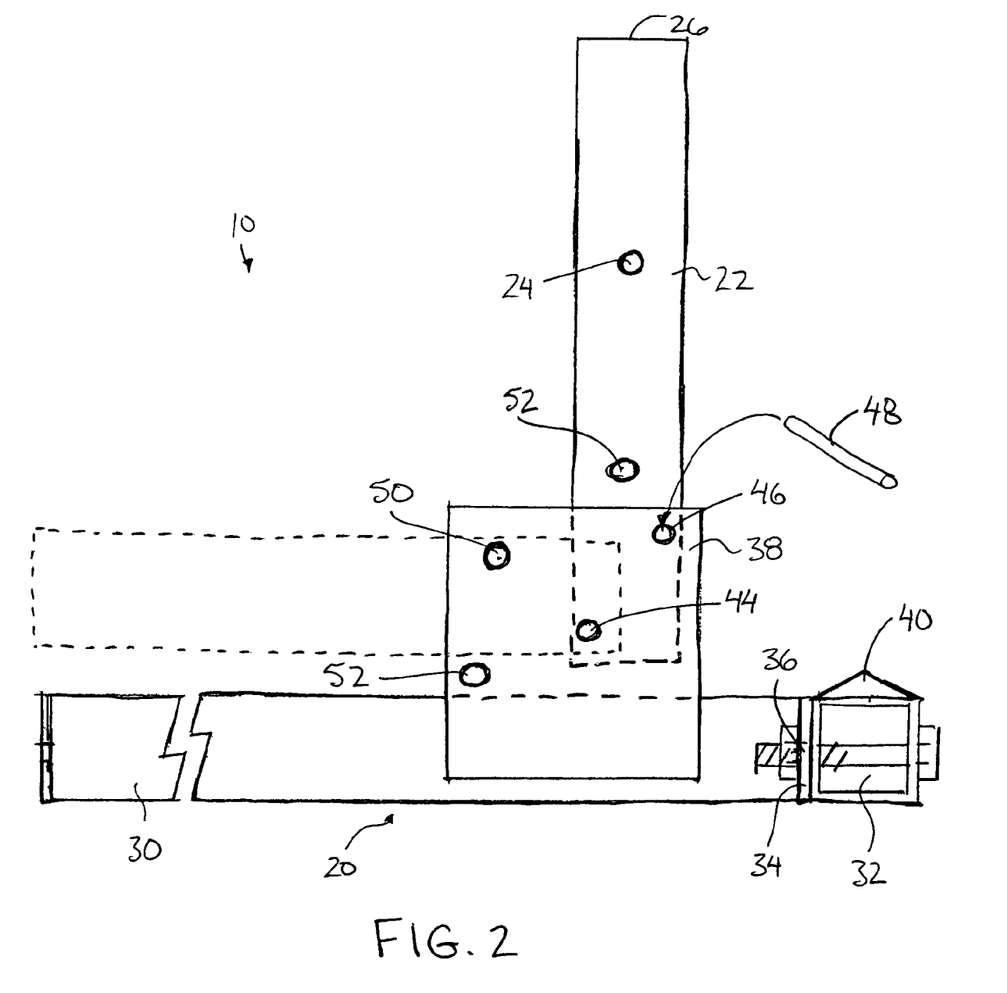
FIG. 2 is a side elevational view of the receiver shown in the wall mounted position in solid line and in the floor mounted position in dotted line.
Figure 3:
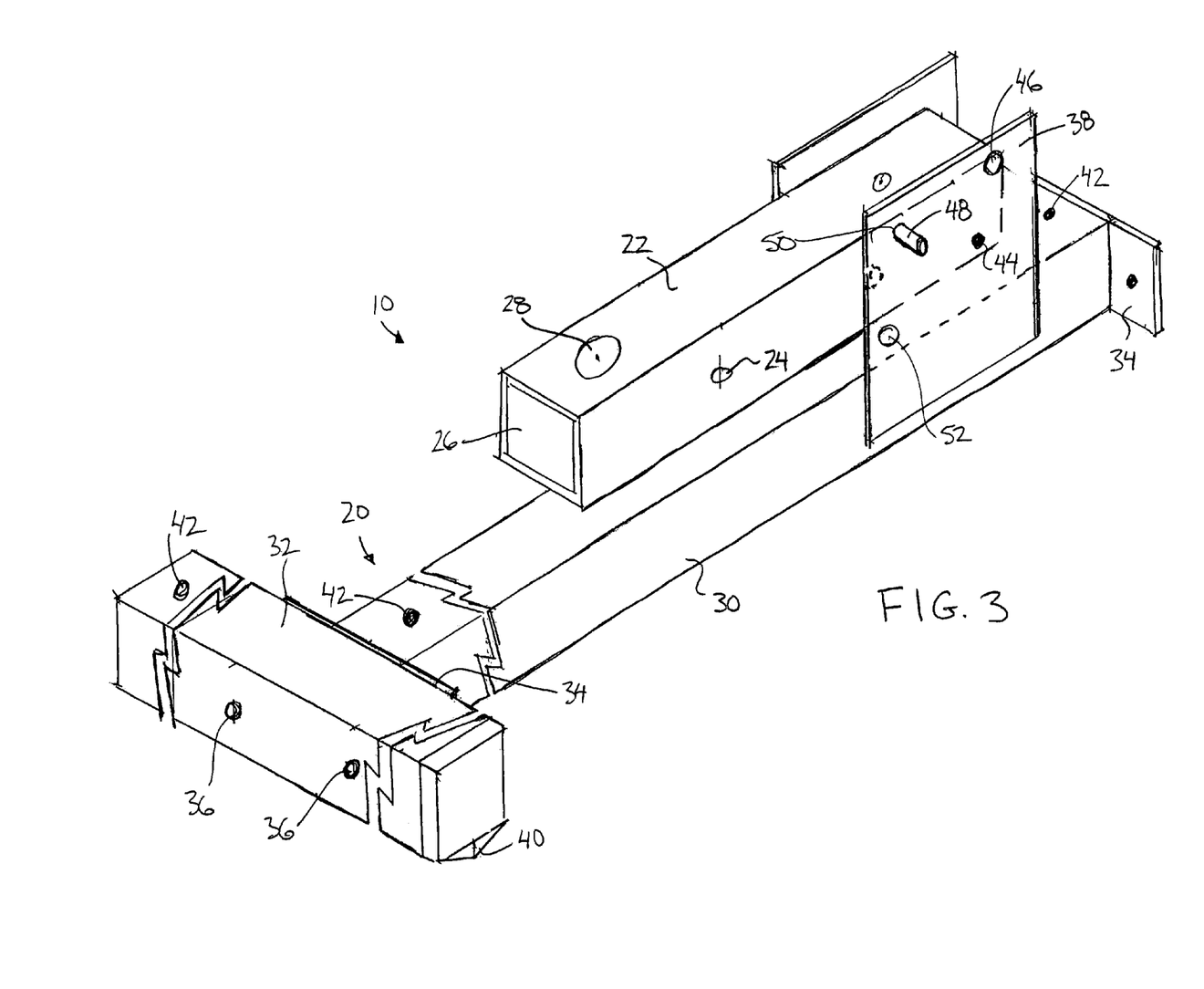
FIG. 3 is a perspective view of the support device according to FIGS. 1 and 2.

Both receiver flanges 38 and the support receiver 22 received therebetween have a pivot aperture 44 extending therethrough in co-operation with one another for receiving a suitable pivot member in the form of a pin or bolt to permit the support receiver 22 to be pivoted relative to the frame upon which it is supported. As illustrated in FIG. 2, the longitudinal direction of the receiver 22 projects perpendicularly to a common plan of the frame in a wall mounted position so that the receiver 22 lies generally horizontally when the frame is mounted adjacent an upright supporting surface. Wall latching apertures 46 extend through the receiver and receiver flanges for alignment with one another in the wall mounted position to receive a locking member or latching pin as required to selectively support the receiver in the wall mounted position.

Releasing the pin 48 permits the receiver to be pivoted into the floor mounted position shown in dotted line in FIG. 2. Floor latching apertures 50 are provided in the receiver and receiver flanges for alignment with one another in the floor mounted position of the receiver for receiving the latch pin 48 therethrough to restrict movement of the receiver away from the floor mounted position. In the illustrated embodiment the wall latching aperture 46 and the floor latching aperture 50 of the receiver are commonly located while the respective apertures in the receiver flange are spaced apart.

Additional locking apertures 52 are formed in the flanges and the receiver for receiving a padlock or steel cable and the like of a locking device to selective lock a bicycle supported thereon or to lock the support device to a fixed obect.

When supporting the frame in the wall mounted position, hangers 54 may be provided which are permanently secured to the wall. Each hanger includes a base portion having an aperture for receiving a fastener to secure the hanger to the wall. A hook portion projects from the base portion which is suitably sized for receiving the cross member securely thereon. In use a pair of the hangers 54 are provided at spaced apart locations at a similar height for supporting the cross support member horizontally thereacross. The third hanger 54 may be provided centered and vertically spaced in relation to the other two hangers for receiving the free end of the main support member therein.

Figure 8:
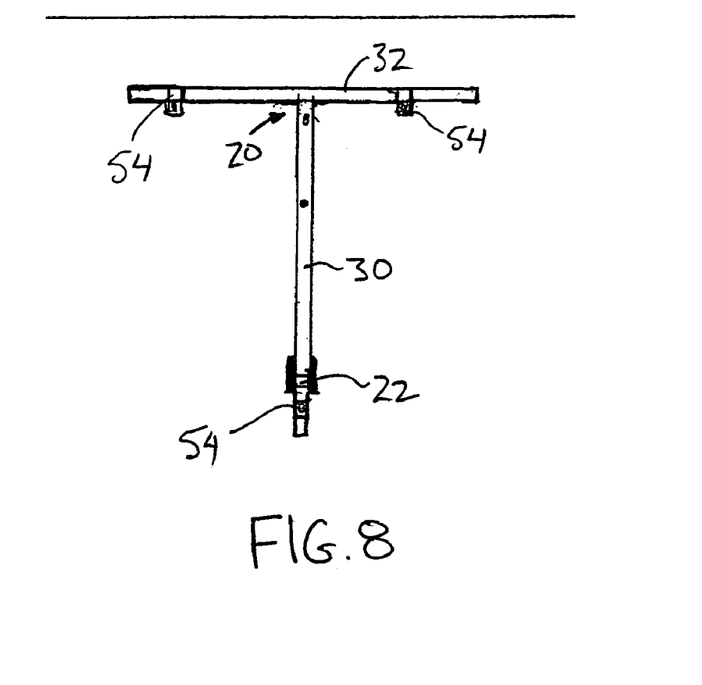
FIGS. 8 and 9 are elevational views of the frame in first and second configurations for mounting in two different wall mounted positions.
Figure 9:
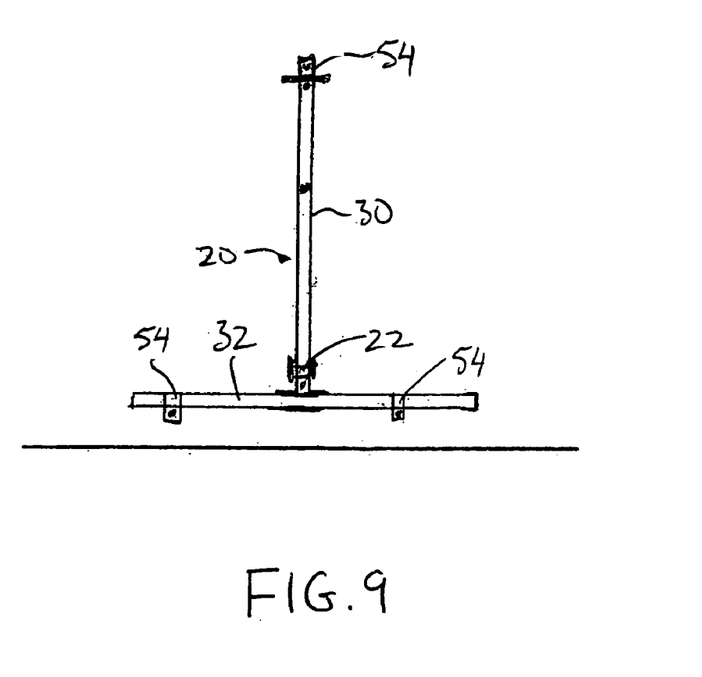

When mounting on a wall, in order to occupy minimal wall space, different mounting configurations between the cross support member and the main support member are permitted. As illustrated in FIG. 8, for long term storage, it may be preferable to support the cross member opposite the receiver flanges so that locating the cross support member adjacent the ceiling permits bike storage and other hitch accessories to be located high against the ceiling. Alternatively when it is desirable for the hitch accessory and related devices supported thereon to remain accessible, it is preferable to support the cross bar adjacent the receiver flanges so that the cross bar may be located adjacent the floor on a supporting surface.

Figure 6:
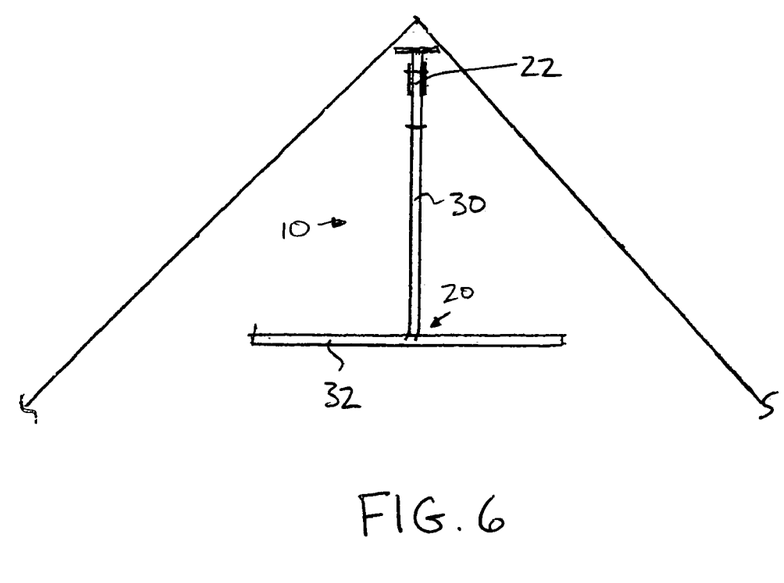
FIG. 6 and FIG. 7 are top plan views of first and second configurations of the frame in two different floor mounted positions.
Figure 7:
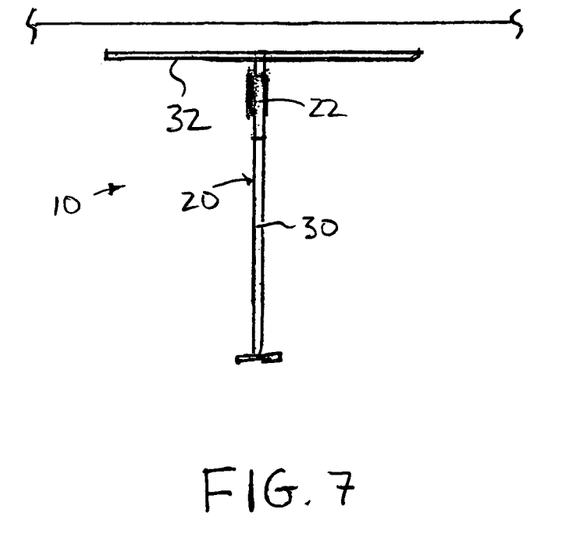

Alternatively when supporting the support device on the floor, location of the cross bar is selected to occupy minimal floor space. When supported adjacent a wall for instance as illustrated in FIG. 7, the cross support member is preferably supported adjacent the receiver flanges so that the cross support member may be supported adjacent the wall. When supporting the support device on the floor in a corner of a room as illustrated in FIG. 6, the cross support member is located opposite the receiver flanges so that the receiver flanges can be nestled into the corner of the room. In all mounting configurations, the support receiver 22 is supported at one end of the main support member to project inwardly towards the open free end thereof facing the opposing end of the main support member.

Figure 4:
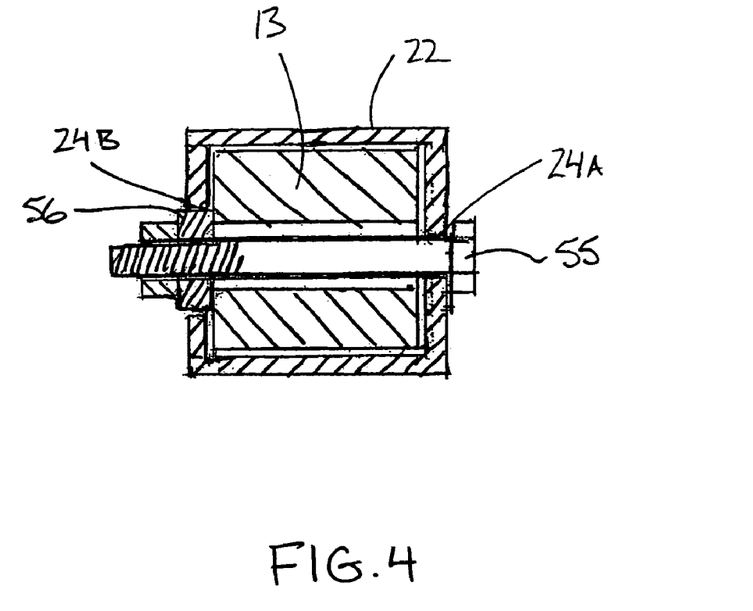
FIG. 4 and FIG. 5 are sectional views of the receiver shown mated with a tongue of 1¼ inch diameter and a tongue of 2 inch diameter respectively.
Figure 5:
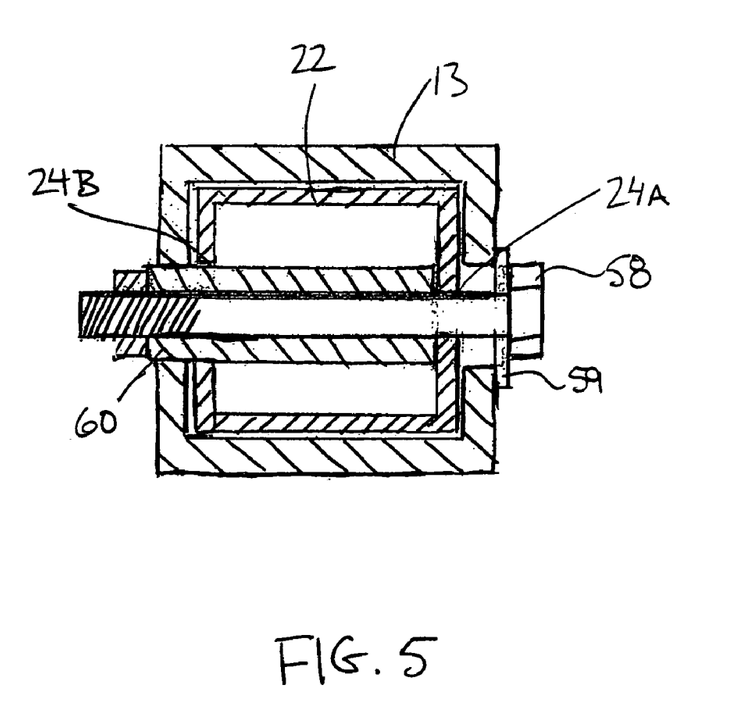

Turning now to FIGS. 4 and 5, the transverse apertures 24 will now be described in further detail. The transverse aperture 24A on a first side of the receiver is smaller than the aperture 24B on the opposing side. The small aperture 24A permits a small pin to be received slidably therethrough and through the opposing side where a washer 56 surrounds the small pin 55 while occupying the larger diameter of the larger 24B within which it is received. Securement of a nut to the threaded end of the small pin 55 provides a clamping force between the nut and the head of the pin 55 on the opposing side to provide a clamping force between the tongue and the support receiver when a narrow tongue of 1¼ inches in diameter is received therein. When tightening the nut, the washer received through the larger hole 24B provides clamping of the tongue against the opposing inner side of the receiver to produce a clamping force transverse to the longitudinal direction of the receiver for reducing any wobble typically associated with hitch accessories.

As illustrated in FIG. 5, the same small aperture 24A and larger aperture 24B are used to also provide a clamping force when a tongue having a 2 inch outside diameter is received over top of the receiver instead. A similarly narrow bolt 58 is received in the smaller hole 24A to extend through to the opposing side. A washer 59 supported at a head of the bolt 58 clamps against the outer side of the tongue. A sleeve 60 is received through the large aperture 24B having a diameter typical of the latching pin of 2 inch outside diameter hitch tongues. The length of the sleeve is suitably arranged to extend between the inside surface of the receiver to the opposite outside surface of the tongue. Securement of a nut at the free end opposite the head of the bolt provides clamping of the sleeve against the inner side of the receiver to again provide a clamping force perpendicular to the longitudinal direction of the receiver to clamp the receiver against an inner side of the surrounding tongue for reducing wobble.

Figure 10:
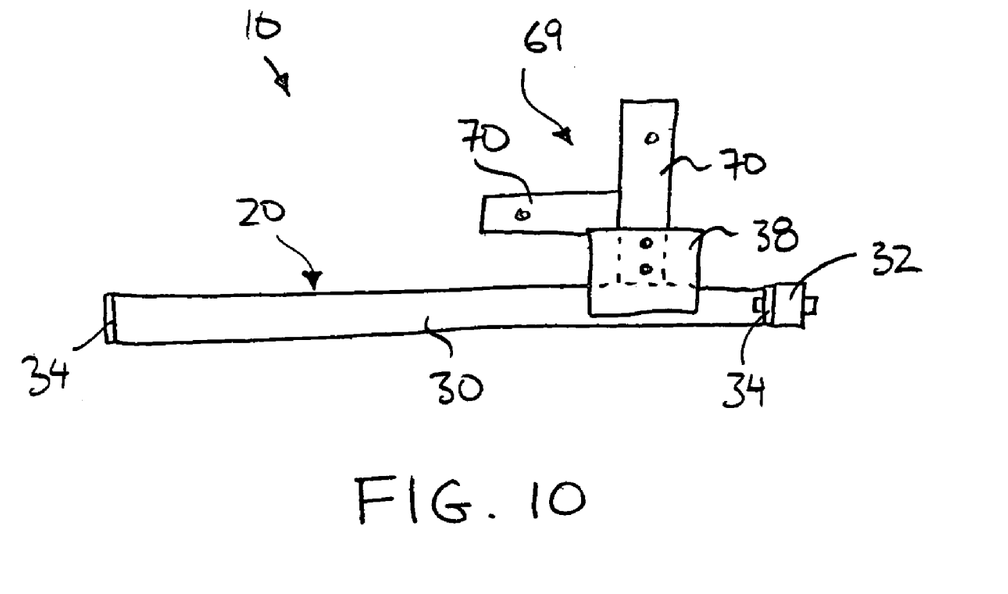
FIG. 10 is a side elevational view of a second embodiment of the support device.

Turning now to FIG. 10, in a further embodiment the receiver 22 may be configured differently to comprise a receiver 69 including two tubes 70 orientated at right angles to one another. Each tube would be similarly configured to the receiver 22 for slidably receiving the tongue of a hitch therein or over top thereof. The receiver 69 is again received between the receiver flanges with the remainder of the frame being configured identically to the previous embodiment. The tubes 70 are orientated such that one of the tubes extends parallel to the common plane of the frame in the floor mounted position while the other is orientated in the wall mounted position. In yet further arrangements, a single receiver such as the receiver 22 of the first embodiment may be provided with mounting apertures which permits bolting in either the wall mounted or floor mounted positions instead of permitting pivoting between the two positions. Furthermore the receiver element 22 may be provided with apertures therein for securement of a second receiver of similar configuration bolted thereon.

Figure 11:
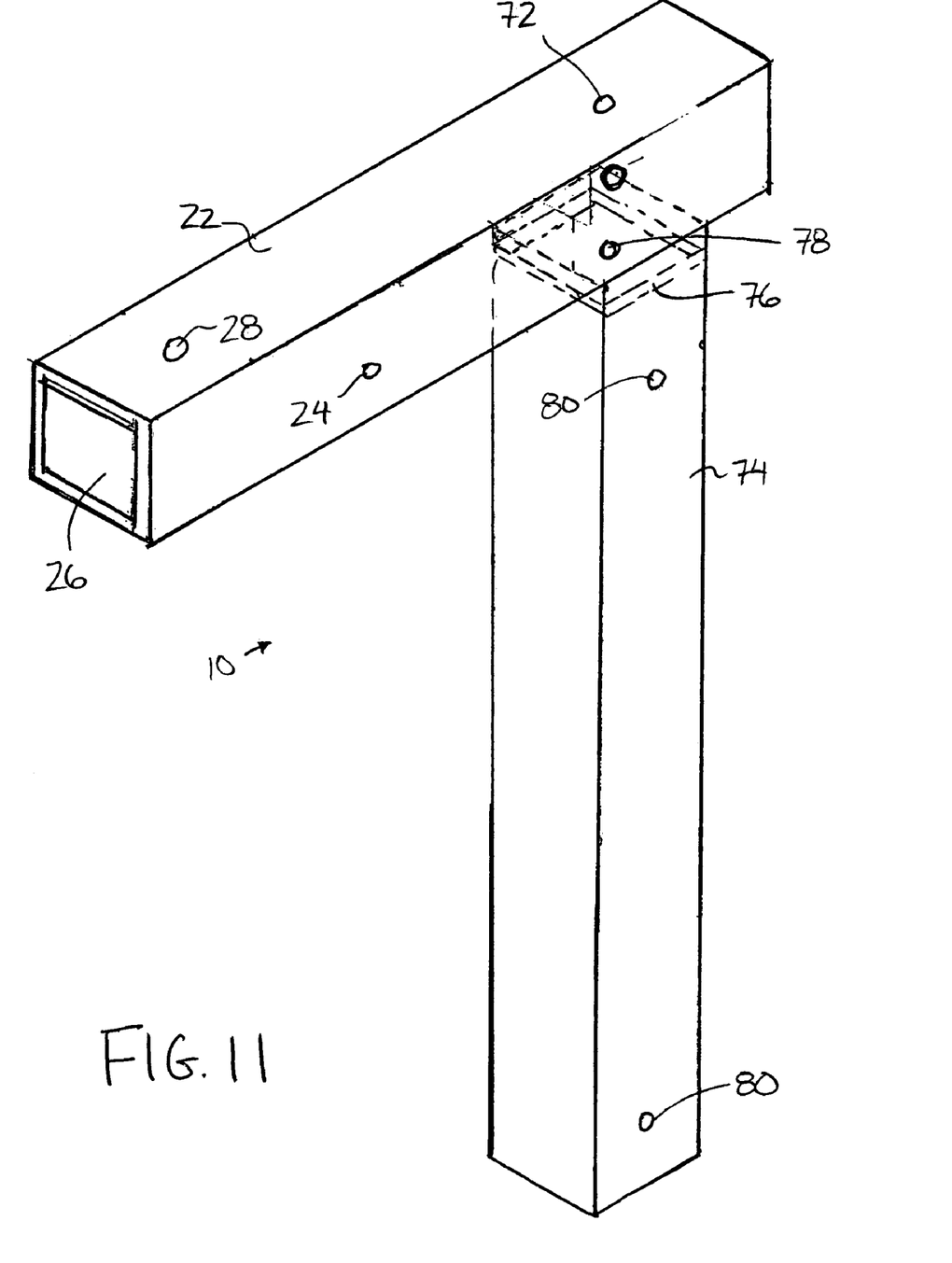
FIG. 11 is a perspective view of a third embodiment of the support device.
Figure 12:
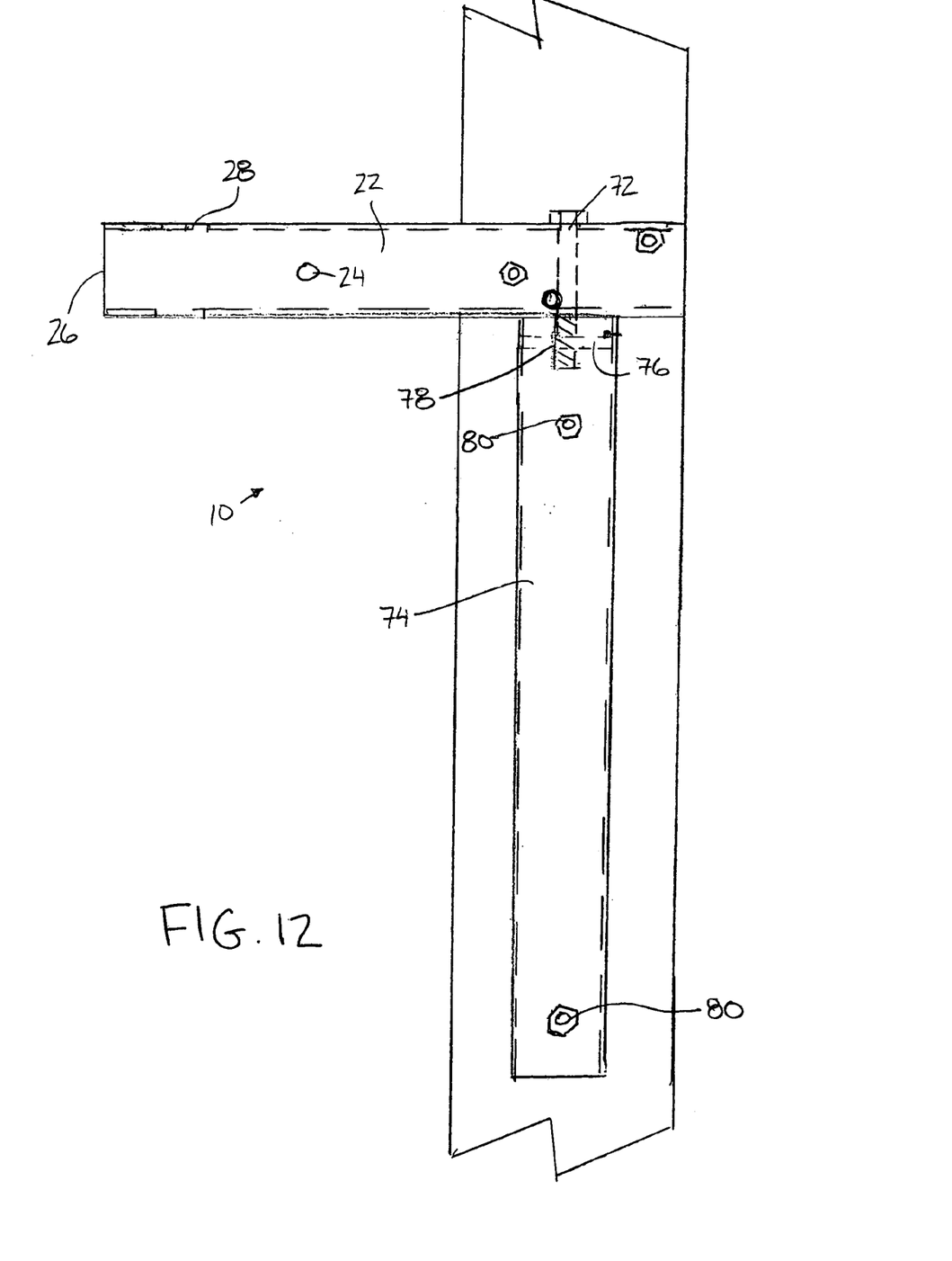
FIG. 12 is a side elevational view of the support device according to FIG. 11.

Turning now to FIG. 11 a further embodiment of the frame is illustrated, with the receiver 22 being configured identically to the first embodiment. In this arrangement a post mounting aperture 72 is provided through the receiver opposite the open free end thereof perpendicularly to the transverse aperture 24 and the longitudinal direction of the receiver. The post mounting aperture 72 receives a threaded fastener therethrough for securement to the end of a mounting post 74. The mounting post comprises a square tube of hollow cross section which locates an end plate 76 at one end thereof having an internally threaded bore 78 therein which receives the fastener extending through the post mounting aperture 72 of the receiver 22. The mounting post 74 includes a plurality of wall mounting apertures 80 extending therethrough perpendicularly to the longitudinal direction of the post and the longitudinal direction of the receiver for mounting adjacent a wall stud as illustrated in FIG. 12.

Figure 1:
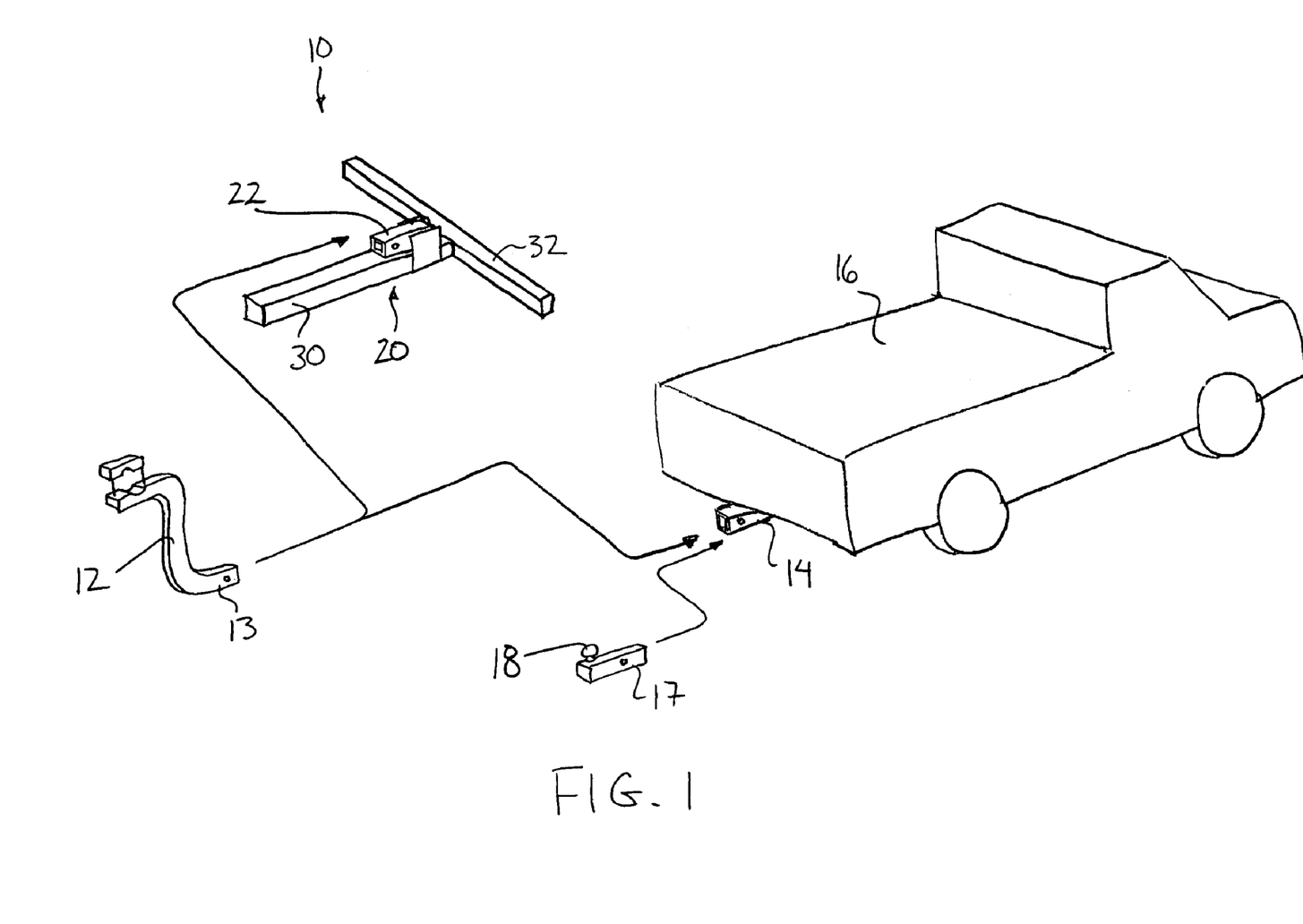
FIG. 1 is a perspective view of the support device for use with a hitch accessory normally received in a vehicle hitch receiver.

In use, hitch accessories of the type including bike racks supported on a vehicle can be removed from the vehicle and inserted directly into the receiver of the support device which then acts as a floor stand when supported on the floor. Pivoting of the receiver into the wall mounted position permits the frame to be suspended from the hangers on the wall where the hitch accessory and devices supported thereon remain readily accessible. Whether using the embodiment of FIG. 1 or of FIG. 10 a hitch accessory can readily be supported on a floor or on the wall using a single support device with secure mounting of the hitch accessory in either instance. The same receiver may be optionally mounted on a wall stud using the post illustrated in FIGS. 11 and 12. And supported on the floor, the configuration of the feet and the T-shaped frame permit a self-levelling configuration as the frame is supported on the two fee of the cross support member and on a third point at the free end of the mate support members. The feet being reversible, do not interfere with the wall mounting.

Trailer hitch mounted bicycle carriers are now common, as is ownership of bicycles in increasing numbers and value by individuals and families. The carrier now only offers ease of transport to this high population of bicycles. It becomes another thing to store and protect when not in use. In the illustrated embodiment, the invention turns a hitch mounted bike carrier into a useful asset, rather than a liability, during the time it is not fulfilling its primary role of transport in a hitch receiver.

As described above, the frame consists of a generally square longitudinal piece fitted with generally rectangular flanges that accept the receiver, and is terminated with flanges at each end that have holes for attaching the cross support member. Holes extend through it for securing the system to surfaces and other structures. A hole may be provided and sized to accept a padlock to secure, via steel cable; the frame, hitch accessory and bicycles to themselves and to the user's secure point.

As described above in relation to FIG. 4, an end view of the receiver is shown with a square commercial 1¼ inch outer diameter carrier within it. To reduce wobble; hole 24A is sized less than and hole 24B is sized equal to a 2 outer diameter carrier's pin hole and is greater than a 1¼ inch carrier's pin hole. A thick washer that is equal to 24B in outer diameter and 24A in inner diameter allows a bolt and nut to pull the commercial carrier snug against the inner wall of the receiver. FIG. 5 is an end view of the receiver showing a commercial 2 inch outside diameter carrier outside of it. Again to reduce wobble, holes 24A and 24B of the transverse aperture 24 are sized as above. A washer is provided wider that the hole at the head of the bolt. A sleeve that is equal to hole 24B in outer diameter and 24A in inner diameter allows the bolt to pull the commercial carrier snug to the outside of the receiver element.

It is evident that there are different types of commercial hitch mounted bicycle carriers and individual storage sites that differ greatly. The features of this invention address these differences so as to be useful in a broad range of applications. The invention is sized and ported to accept the common commercial bicycle carriers including 1¼ inch, 2 inch square shank carriers and also the bolt on type to be secured to the hitch ball mount. The device 10 is constructed to offer an effective broad base for when it is used on a floor. Also, the dimensions are such as to compensate for uneven floors. The receiver that pivots on the base functions to allow the invention to be wall or floor mounted. By allowing the cross element to be attached at either end additional flexibility in use is permitted. It lets the user change the geometry of the base allowing them to position the invention most efficiently at their site. It also lets the user configure it best for seasonal or off seasonal use when wall mounted. The dimensions of the device are such that it functions wall mounted to finished surfaces or mounted to open studs. The modular bolt together design functions to allow the invention to accompany the vehicle, bicycles and users to offer these same functions at destinations as at the home site. It is recognized that some specific users will not need all the above mounting choices, and accordingly a simple open stud or post base as described in FIGS. 11 and 12 are available to function as a lower cost solution. The choice of materials and construction methods function to allow this invention to enter the market at a price that is attractive to the user and profitable to producers and distributors.

The support device 10 provides a stationary system of support for bicycle carriers and other hitch accessories so that the carrier is stored as well as the bicycles it holds. The support device offers the user a wide choice of how such storage can be facilitated. The geometry of the universal base element allows choices that include high wall mount (for overhead off season storage), low wall mount for ease of access or service, free standing floor anywhere mount, free standing corner mount.

The device is usable at sites with finished walls, and at sites that have exposed studs (as are many garages). A choice is provided of a lower cost base element for users to affix to bare studs or posts only.

The device is portable so it could be used when the users reach a destination. The device will serve to accommodate both the carrier and the bicycles, hence freeing the vehicle for unencumbered uses.

The receiver allows access to it by the greatest range of commercial hitch mounted bicycle carriers, these being 2 inch or 1¼ inch diameter square types plus the type that bolts directly to a passenger vehicle trailer hitch ball.

The attachment of the carrier to the receiver element is done in a snug manner to create a stable unit without the inherent wobble that exists at the point where a carrier joins with a receiver.

The complete unit including the assembled hitch accessory and support device 10 is stable when resting on normal uneven floor surfaces.

In addition to carrying or storing bicycles, with the use of the support device 10 a bike carrier type hitch accessory provides a base for a service module that is specifically designed to allow support and rotation of a bicycle for maintenance, service and repair. Also, the device is acts as a bicycle storage rack.

The support device facilitates the locking of bicycles to it, and it to whatever secure point that the user provides.

The support device produces a stationary receiver system that is convenient to use yet is sturdy and durable and is cost effective to manufacture.

The support device employs two connected elements, the support receiver and the frame upon which it is supported.

The receiver is square tubing, sized to fit over 1¼" carriers and to fit inside 2" carriers. Holes are positioned and sized for wobble free connection to these square type carriers using suitable washers and the like as described above. Holes are sized and positioned to allow the bolting on of carriers that are made to be bolted directly to a trailer hitch. Holes are also positioned to allow connection to the base element. Holes are further positioned to allow locking of the elements to each other, to the bicycles and to the user's secure point.

The universal base element is square tubing with upwardly protruding flanges that are sized and holed to accept the receiving element in either parallel orientation or normal to it. Each end of the base tube is finished with a flange that allows the stabilizing cross member to be attached at either end. The cross member has downwardly protruding feet that, in conjunction with the base tube provide stability on normal uneven floors. The universal base element with the receiving element attached is the stationary receiver.

The alternate lower cost specific base element provides support for the receiving element in situations where attachment to bare studs or posts only is required. This is square tubing with holes for connectors and with one end fitted with a threaded plate to allow bolting to the receiving element. This specific base element when connected to the receiving element forms an L-shaped bracket which when fixed to the side of a stud or post becomes the stationary receiver.

Hangers and fasteners that are to be attached appropriately by the user complete the system when supporting the support device on an upright supporting surface such as a wall.

While various embodiments of the present invention have been described in the foregoing, it is to be understood that other embodiments are possible within the scope of the invention. The invention is to be considered limited solely by the scope of the appended claims.

The invention claimed is:

1. A support device for supporting a hitch accessory of the type which is receivable in a vehicle hitch receiver; the support device comprising:
   a support receiver comprising an elongate member having a cross section of suitable shape and dimension for mating with the hitch accessory in a telescoping configuration for relative sliding movement in a longitudinal direction of the support receiver; and
   a frame lying generally in a common plane and supporting the support receiver thereon in both a floor mounted position in which the longitudinal direction of the support receiver is generally parallel to the common plane of the frame and a wall mounted position in which the longitudinal direction of the support receiver is generally perpendicular to the common plane of the frame;
   the frame fixedly maintaining the support receiver in both the floor mounted and wall mounted positions relative to the frame;
   the frame extending in a longitudinal direction between ends; and
   the support receiver being supported at one end of the frame to project towards an open free end of the support receiver which faces an opposing one of the ends of the frame in the floor mounted position.

2. The support device according to claim 1 wherein the support receiver is pivotally supported on the frame and wherein there is provided a stop member receivable through co-operating apertures in both the support receiver and the frame in both the floor mounted and wall mounted positions for selectively maintaining the support receiver in the respective positions.

3. The support device according to claim 1 wherein the support receiver is a tubular member having an internal dimension between 1¼ inches and 1⅝ inches and having an external dimension between 1½ inches and 1⅞ inches.

4. The support device according to claim 1 wherein the frame includes 3 ground engaging points oriented in a triangular pattern for supporting the frame thereon.

5. The support device according to claim 1 wherein the frame comprises a main support member and a cross support member supported at one end of the main support member in a T-shaped configuration, the support receiver being supported on the main support member.

6. The support device according to claim 5 wherein the frame includes mounting apertures formed therein and arranged for supporting the support receiver adjacent the cross support member in a first mounting configuration and for supporting the support receiver opposite the cross support member in a second mounting configuration.

7. The support device according to claim 5 wherein the main support member and the cross support member are selectively coupled together with threaded fasteners to permit disassembly and reassembly thereof.

8. The support device according to claim 5 wherein there is provided a pair of hangers for being supported on an upright supporting surface spaced apart from one another, the hangers being suitably shaped for supporting the cross support member at spaced positions thereon.

9. The support device according to claim 1 wherein the support receiver includes a through aperture suitably sized for mounting a hitch ball thereon.

10. The support device according to claim 1 wherein the support receiver is pivotally secured to the frame with threaded fasteners received in cooperating apertures formed in the support receiver, whereby the support receiver is arranged to be directly mounted onto a supporting surface by threaded fasteners.

11. The support device according to claim 1 wherein there is provided clamping means arranged for providing a clamping force between the hitch accessory and the support receiver in a direction transverse to relative sliding movement therebetween.

12. The support device according to claim 1 wherein the frame includes a locking aperture arranged for receiving a locking member.

13. The support device according to claim 1 wherein the frame comprises a main support member and a cross support member mounted transversely to the main support member, the support receiver being supported on the main support member at one end thereof.

14. The support device according to claim 13 wherein the cross support member is supported at one end of the frame and the frame includes mounting apertures formed therein for supporting the support receiver on the main support member adjacent the cross support member in a first mounting configuration and for supporting the support receiver on the main support member opposite the cross support member in a second mounting configuration.

15. The support device according to claim 13 wherein the main support member and the cross support member are selectively coupled together with threaded fasteners to permit disassembly and reassembly thereof.

* * * * *